(12) United States Patent
Iida et al.

(10) Patent No.: US 8,864,002 B2
(45) Date of Patent: Oct. 21, 2014

(54) SIDE TRUNK MOUNTING STRUCTURE FOR TWO-WHEELED MOTOR VEHICLE

(75) Inventors: Rinatsu Iida, Wako (JP); Ikuo Hara, Wako (JP); Eiji Toriyama, Wako (JP); Satoshi Kogo, Wako (JP); Hirotoshi Akita, Niiza (JP); Keiichi Kaji, Niiza (JP)

(73) Assignee: Honda Motor Co., Ltd., Tokyo (JP)

( * ) Notice: Subject to any disclaimer, the term of this patent is extended or adjusted under 35 U.S.C. 154(b) by 465 days.

(21) Appl. No.: 12/996,572

(22) PCT Filed: Jul. 6, 2009

(86) PCT No.: PCT/JP2009/062273
§ 371 (c)(1),
(2), (4) Date: Dec. 6, 2010

(87) PCT Pub. No.: WO2010/021209
PCT Pub. Date: Feb. 25, 2010

(65) Prior Publication Data
US 2011/0073627 A1    Mar. 31, 2011

(30) Foreign Application Priority Data

Aug. 22, 2008   (JP) .................................. 2008-214181

(51) Int. Cl.
| | | |
|---|---|---|
| *B62J 7/00* | (2006.01) | |
| *B62J 9/00* | (2006.01) | |
| *B62J 11/00* | (2006.01) | |
| *B60R 7/00* | (2006.01) | |
| *B62J 15/00* | (2006.01) | |
| *B62J 7/04* | (2006.01) | |

(52) U.S. Cl.
CPC ...... *B62J 7/04* (2013.01); *B62J 9/00* (2013.01); *B62J 9/001* (2013.01); *B62J 15/00* (2013.01)
USPC ........... 224/413; 224/423; 224/429; 224/430; 224/431; 224/433; 224/42.4; 224/547; D12/407

(58) Field of Classification Search
CPC ................................... B62J 9/00; B62J 9/001
USPC .......... 424/413; D12/407; 224/413, 423, 429, 224/430, 431, 433, 42.4, 547
See application file for complete search history.

(56) References Cited

U.S. PATENT DOCUMENTS 4,096,980 A * 6/1978 Clow ............................ 224/441
6,234,266 B1 * 5/2001 Saiki ............................ 180/219
(Continued)

FOREIGN PATENT DOCUMENTS

| JP | 62-59178 A | 3/1987 |
| JP | 2007-55283 A | 3/2007 |
| JP | 2008-500215 A | 1/2008 |

OTHER PUBLICATIONS

Translation—JP2007-055283.*

*Primary Examiner* — Brian D Nash
*Assistant Examiner* — Derek Battisti
(74) *Attorney, Agent, or Firm* — Birch, Stewart, Kolasch & Birch, LLP

(57) ABSTRACT

A side trunk mounting structure which enhances the external appearance of a two-wheeled motor vehicle. Mounting holes (113F, 113r) for mounting the side trunk (111) are formed in a rear fender (17). The side trunk mounting holes are located below a rider's seat (15).

14 Claims, 14 Drawing Sheets

(56) References Cited

U.S. PATENT DOCUMENTS

| | | | |
|---|---|---|---|
| 6,293,450 B1 * | 9/2001 | Aron | 224/430 |
| 6,505,765 B1 * | 1/2003 | Proctor et al. | 224/413 |
| 6,840,417 B2 * | 1/2005 | Heinrich et al. | 224/413 |
| 2004/0149792 A1 * | 8/2004 | Akita et al. | 224/413 |
| 2005/0121482 A1 * | 6/2005 | Zickefoose | 224/413 |
| 2005/0150921 A1 * | 7/2005 | Schneider | 224/413 |
| 2006/0220406 A1 * | 10/2006 | Misaki et al. | 296/37.1 |
| 2007/0062993 A1 | 3/2007 | Reinhart | |
| 2007/0235698 A1 * | 10/2007 | Borade et al. | 252/511 |
| 2008/0073396 A1 * | 3/2008 | Chiang et al. | 224/413 |

\* cited by examiner

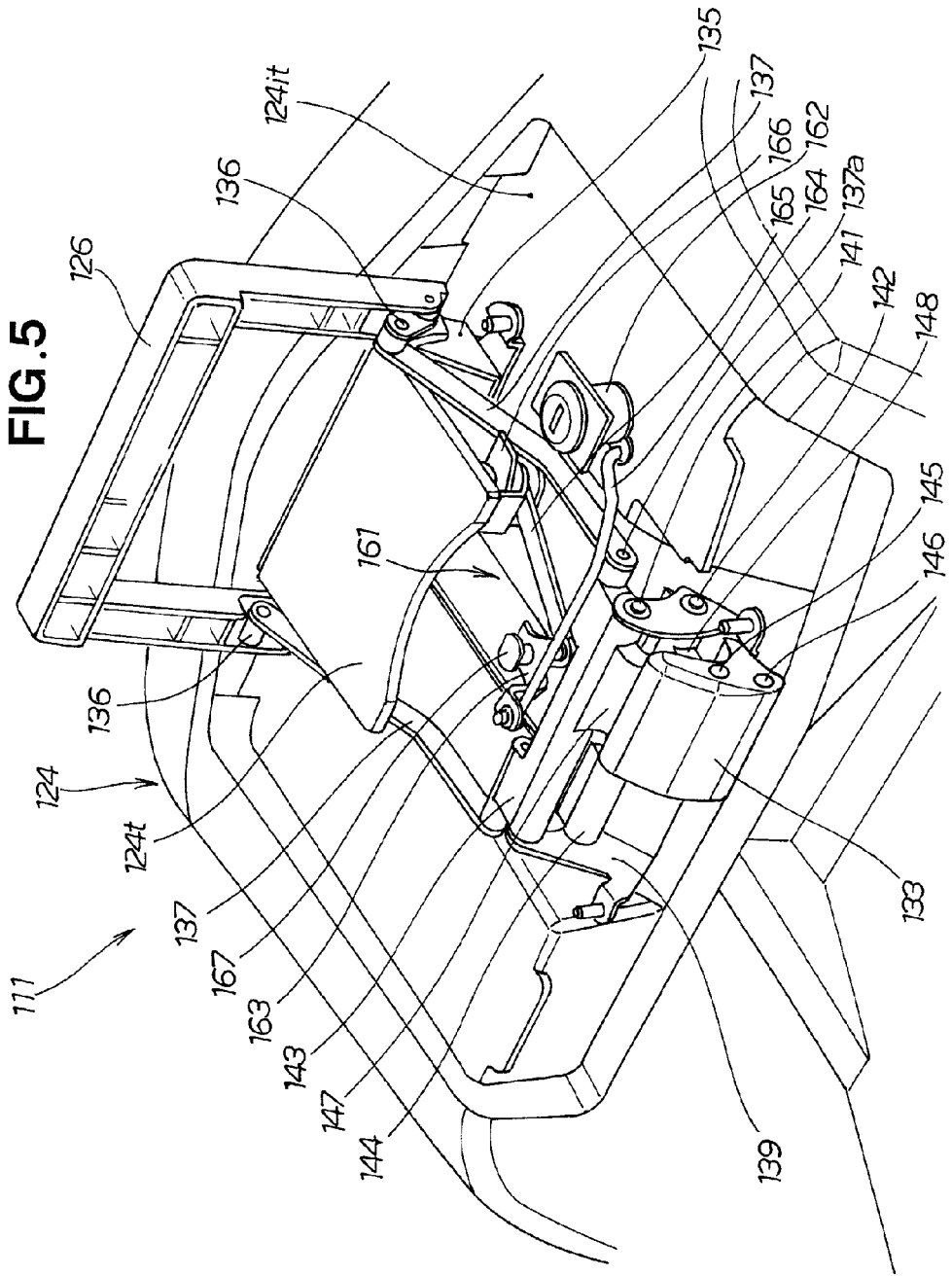

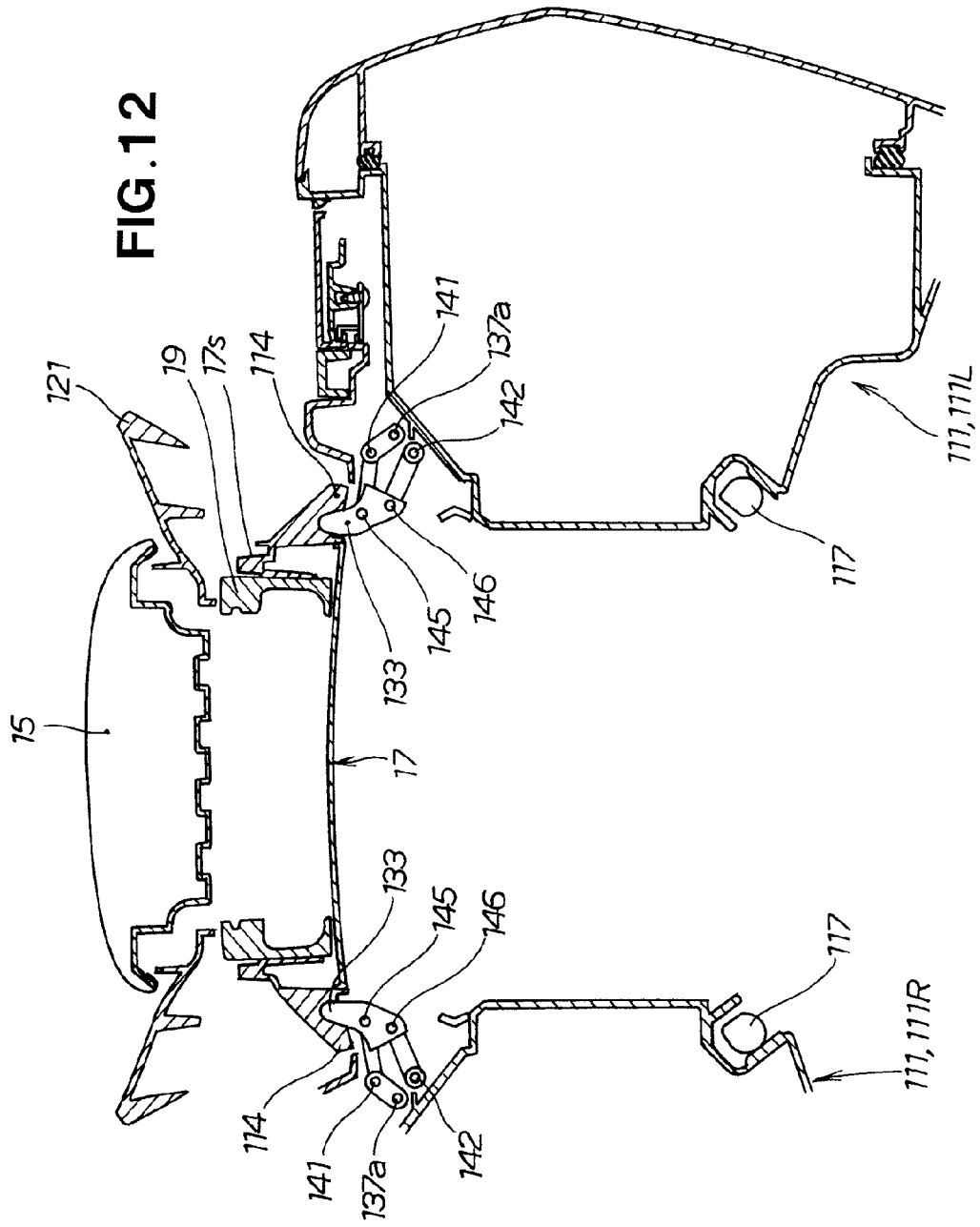

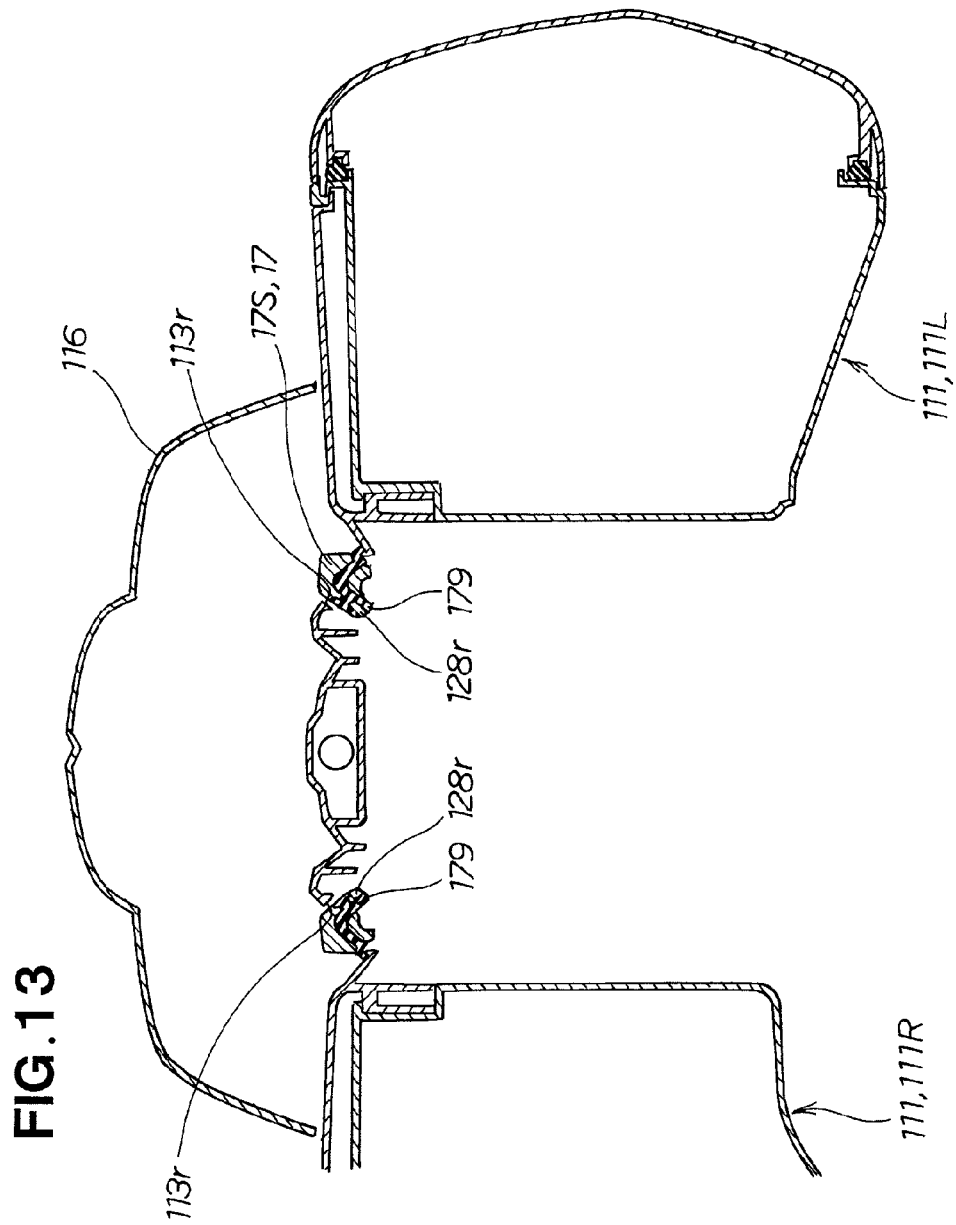

ately, the degree of freedom in the design of the frame is
SIDE TRUNK MOUNTING STRUCTURE FOR TWO-WHEELED MOTOR VEHICLE

TECHNICAL FIELD

The present invention relates to an improvement in a side trunk mounting structure of a two-wheeled motor vehicle.

BACKGROUND ART

There are known side trunk mounting structures of two-wheeled motor vehicles having side trunks detachably provided to either side of a rear part of a vehicle body, such as the structure disclosed in, e.g., Patent Document 1.

The side trunk mounting structure disclosed in Patent Document 1 comprises a rear frame installed on a rear part of a vehicle body, and a trunk support part provided to the rear frame. The rear frame has first concave parts set apart from each other in a longitudinal direction, and a second concave part provided between the first concave parts. The trunk support part is configured from the first concave parts and the second concave part. The side trunk has a side trunk latching means, and is mounted to the rear frame by the side trunk latching means being latched onto the trunk support part.

The rear frame is covered by a tail cover. The tail cover has a plurality of openings formed so as to match up with the positions of the first concave parts and the second concave part.

However, since the mounting structure according to Patent Document 1 is complex, there is less degree of freedom in the design of the frame, or part of the frame becomes exposed, so that additional consideration must be given to the external appearance.

PRIOR ART DOCUMENT(S)

Patent Document(S)

Patent Document 1: Japanese Patent Application Laid-Open Publication No. 2007-55283

SUMMARY OF INVENTION

Technical Problem

An object of the present invention is to provide a side trunk mounting structure for a two-wheeled motor vehicle whereby the vehicle can have a more attractive external appearance when the side trunk has been mounted, without reducing the degree of freedom in frame designing.

Solution to Problem

According to one aspect of the present invention, there is provided a side trunk mounting structure for a two-wheeled motor vehicle, comprising: a rear frame disposed on a rear part of a vehicle body; a rear fender, provided below the rear frame, for covering a rear wheel; a rider's seat, provided above the rear fender, for allowing a rider to sit on; and a side trunk mounted to a side surface of the rear fender, wherein the rear fender has a plurality of side trunk mounting holes for mounting the side trunk, the side trunk has a plurality of pawls, extending inwardly of the vehicle body and bending downward, for hooking into the side trunk mounting holes, and a plurality of lower, provided below the respective pawls and extending upwardly inwardly of the vehicle body, for holding the rear fender in cooperation with the pawls, and the side trunk is mounted to the rear fender by the rear fender being held between the pawls and the lower engaging arms.

Preferably, each of the side trunk mounting holes is provided below the rider's seat.

Preferably, the rear fender is formed from a resin containing glass fibers or carbon fibers.

Preferably, the rear fender has a plurality of downwardly extending hanging parts held by the lower engaging arms.

Preferably, the rear fender is fastened to the vehicle body frame by at least front and rear fastening parts, and at least one of the plurality of side trunk mounting holes is provided between the two front and rear fastening parts.

It is preferred that the side trunk have a side surface facing the vehicle body frame and the side surface be provided with an engaging concave part for engaging with a latching arm that is attached to the vehicle body frame side and that extends from a rider's step holder.

Each of the pawls which hook into the individual side trunk mounting holes is provided with an elastic member.

Advantageous Effects of Invention

In the present invention, the plurality of side trunk mounting holes is provided to the rear fender, and the side trunk is mounted directly in the side trunk mounting holes provided to the rear fender.

In conventional side trunk mounting structures, the side trunk is mounted in side trunk mounting holes formed in the top surface of the rear frame. In this case, since the side trunk mounting holes are opened in the top surface of the rear frame, when the side trunk is removed, part of the rear frame can be seen through the side trunk mounting holes, and the external appearance of the vehicle is compromised. Additionally, the degree of freedom in the design of the frame is reduced by a commensurate amount relative to where the side trunk mounting holes are provided in the top surface of the rear frame.

In the present invention, this is addressed by having the side trunk mounted on the rear fender; therefore, the side trunk mounting portion on the side of the rear frame cannot be seen from the rear fender, and the vehicle can have a more attractive external appearance. Furthermore, the degree of freedom in the design of the frame is not compromised.

Since the side trunk mounting holes are provided below the rider's seat, they can be obscured from view when the vehicle is seen from above. If the side trunk mounting holes are obscured from view, the external appearance of the vehicle will not readily be affected even when the side trunk is removed, and the vehicle can have an even more attractive external appearance.

Since the rear fender is formed from a resin containing glass fiber or carbon fiber, the rigidity of the rear fender can be increased, and the load-bearing capacity can be increased.

Since hanging parts extend downward in the rear fender, the side trunk can be supported even when the lower engaging arms are short.

Since one of the plurality of side trunk mounting holes is provided between the two front and rear fastening parts, the saddlebag mounting strength can be increased.

Since the side trunk is provided with engaging concave parts for engaging with latching arms that extend from rider's step holders, the saddlebag can, when in a mounted state, have a more attractive appearance.

The pawls are provided with elastic members. The pawls are pressed into the rear fender with the elastic members disposed therebetween, and are made to adhere firmly to the saddlebag mounting portion of the rear fender, thereby making it unlikely that gaps will form between the pawls and the saddlebag mounting holes even when there is a change in the mounting relationship between the pawls and the saddlebag mounting holes.

BRIEF DESCRIPTION OF DRAWINGS

FIG. 5 is a perspective view of the lower engaging arm link assembly provided to the side trunk;

FIG. 12 is a sectional view taken along line 12-12 of FIG. 9;

FIG. 13 is a sectional view taken along line 13-13 of FIG. 9;

MODE FOR CARRYING OUT THE INVENTION

The preferred embodiments of the present invention are described below with reference to the accompanying drawings.

Figure 1:
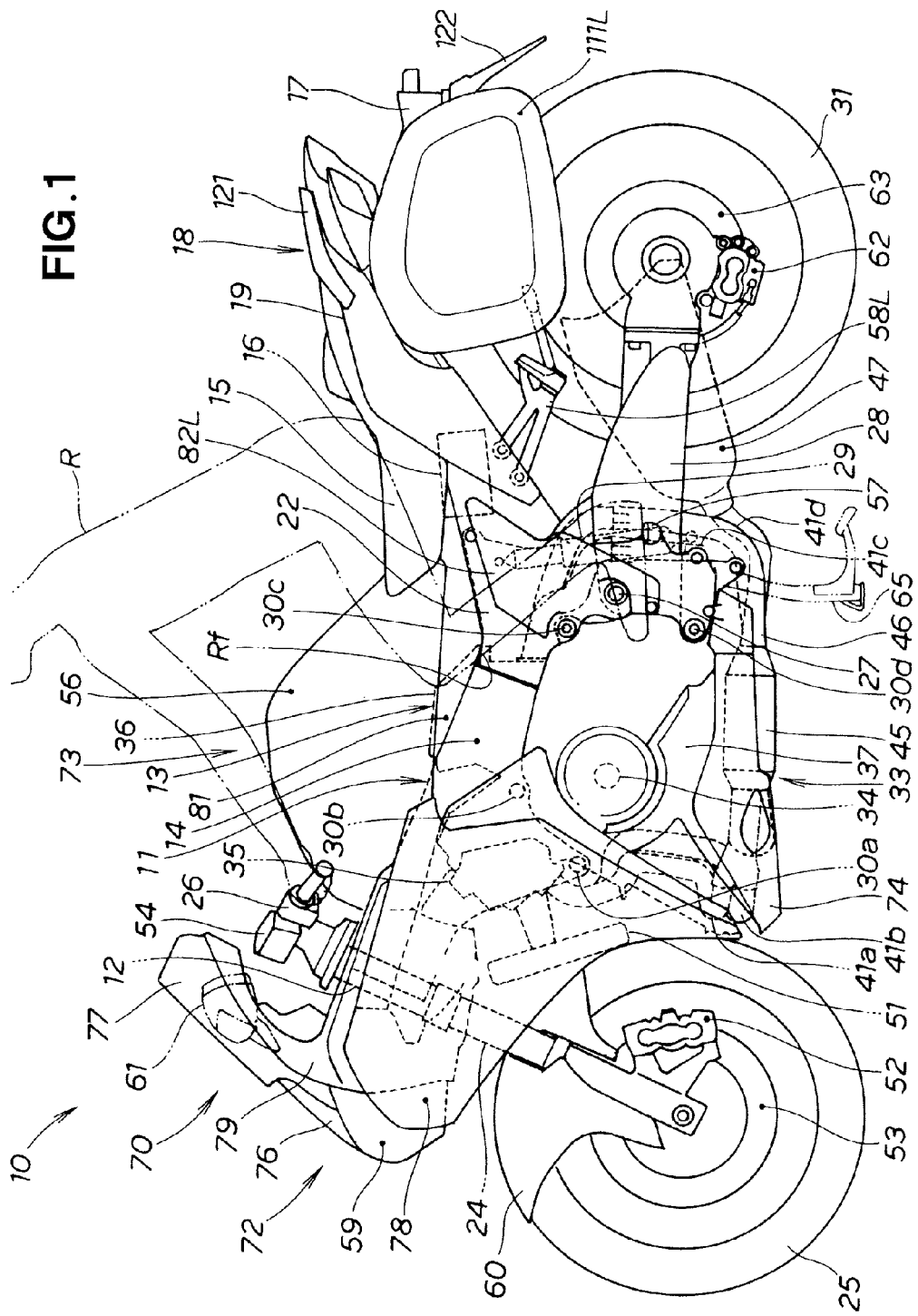
FIG. 1 is a left side view of a two-wheeled motor vehicle to which the side trunk according to the present invention is mounted.

A two-wheeled motor vehicle 10 comprises a vehicle body frame 11 as shown in FIG. 1. The vehicle body frame 11 is composed of a head pipe 12; a main frame 14 which extends rearward from the head pipe 12 and supports an engine 13; and a rear frame 19 for supporting a rider's seat 15 extending rearward from a top part of a rear end of the main frame 14, mounting a battery 16 and other electrical components and the like, and supporting a vehicle body rear part 18 including a rear fender 17. The main frame 14 includes a pivot plate 22 which is provided to the rear end part of the main frame 14 and which supports a swing arm 28.

The pivot plate 22 has a pivot shaft 27. The rear swing arm (the swing arm) 28 extends rearward from the pivot shaft 27. A rear cushion unit 29 for absorbing impact is provided between the main frame 14 and the swing arm 28. A rear wheel 31 is mounted on a rear end of the swing arm 28. The rear wheel 31 is driven by a drive shaft (not shown) which links the engine 13 and the rear wheel 31 together.

A front fork 24 is provided to the head pipe 12. A front wheel 25 is mounted on the bottom end part of the front fork 24. A steering handlebar 26 for steering the front wheel 25 is provided to the top end part of the front fork 24.

The engine 13 is an engine having four cylinders arranged in a "V"-shaped configuration. The engine 13 is supported on the main frame 14 with first through fourth support points 30a to 30d disposed therebetween. The first through fourth support points 30a to 30d are provided horizontally along the vehicle width direction. The support points provided to the pivot plate 22 are the third and fourth support points 30c, 30d. In other words, the engine 13 is supported by the main frame 14 and the pivot plate 22.

The V-shaped four-cylinder engine 13 has a crank case 37, a first cylinder 35 extending in a forward and upward direction relative to a crankshaft 34 provided to the crank case 37, and a second cylinder 36 extending in a rearward and upward direction relative to the crankshaft 34. The first cylinder 35 and the second cylinder 36 are formed into a V shape. When the vehicle is viewed from the side, the main frame 14 lies over the first cylinder 35 and the second cylinder 36, which constitute a top part of the engine 13. Part of the pivot plate 22 lies above the crank case 37, which constitutes a rear part of the engine 13.

The V-shaped four-cylinder engine 13 is connected to an exhaust device 33. The exhaust device 33 is configured from exhaust pipes 41a to 41d extending from the cylinders 35, 35, 36, 36; a catalyst pipe 45 wherein the exhaust pipes 41a to 41d converge and the exhaust gas is cleaned; an overall assembly pipe 46 extending from the catalyst pipe 45; and a muffler 47 connected to the overall assembly pipe 46.

A radiator unit 51 cools the engine 13. A front disk brake caliper 52 is provided to the front fork. A front disk plate 53 is held by the front disk brake caliper 52 provided to the front wheel 25. A front master cylinder 54 is provided to the steering handlebar 26. A fuel tank cover 56 covers a fuel tank mounted on the main frame 14 and also serves as a cowl 70. A driver step 57 is mounted on the main frame 14. A rider's step 58 is mounted on the rear frame 19.

The reference numerals 59, 60, and 61 indicate a headlight, a front fender, and a mirror, respectively. The reference numerals 62 and 65 indicate a rear disk brake caliper and a main stand, respectively. A rear disk plate 63 is held by the rear disk brake caliper 62 provided to the rear wheel 31.

The following is a description of the cowl 70 constituting what is primarily the externally visible part of the two-wheeled motor vehicle 10.

The cowl 70 comprises a front cowl 72 for covering the front of the vehicle body frame 11 via a cowl stay extending from the head pipe 12, a side cowl 73 which is provided as a continuation of the front cowl part 72 and which covers the side of the vehicle, and an under cowl 74 provided below the engine 13, it being an object to improve the external appearance of the windshield and the vehicle.

The front cowl 72 includes an upper center cowl 76 for covering a top region of the headlight 59, a windscreen 77 extending above the upper center cowl 76, and part of a front upper side cowl 79 to which a middle cowl 78 covering the side of the main frame 14 is mounted, the front upper side cowl 79 supporting left and right sides of the windscreen 77.

The side cowl 73 includes the front upper side cowl 79 for supporting the left and right sides of the windscreen 77; the middle cowl 78 for covering the head pipe 12 and the side of the main frame 14; a knee cover 81 for covering a bottom of the fuel tank cover 56 the knee cover being located between legs Rf of a driver R while the vehicle is driven, and a pivot plate cover 82 which is provided below the knee cover 81 and which covers the external surface of the pivot plate 22, which is a structural element of the main frame 14.

To supplement the rear part of the vehicle, the rear frame 19 is disposed on the rear part of the vehicle body, the rear fender 17 for covering the rear wheel 31 is provided below the rear frame 19, the rider's seat 15 on which the rider sits is provided above the rear fender 17, and side trunks 111L, 111R (see FIG. 9) in which items are stowed are mounted on the rear fender 17.

Figure 9:
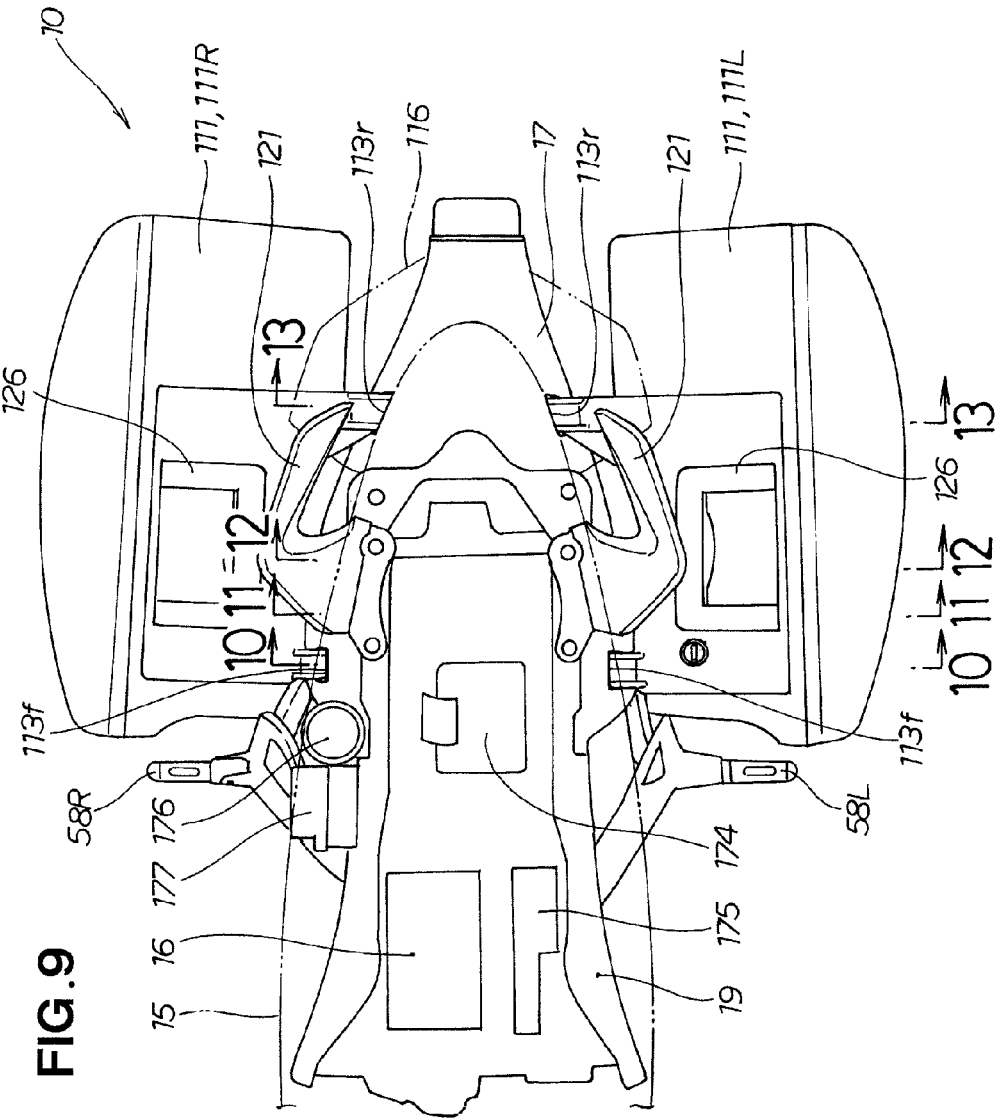
FIG. 9 is a top surface view of a state in which the side trunk is mounted onto the rear fender shown in FIG. 8.

Hereinbelow, the left and right side trunks 111L, 111R (only the nearer symbol 111L is shown) are provided in bilateral symmetry about a center line of the vehicle as shown in FIG. 9. Since there is no significant difference between their structures, the left side trunk 111L will be described as a side trunk 111, and the right side trunk 111R will not be described.

Figure 2:
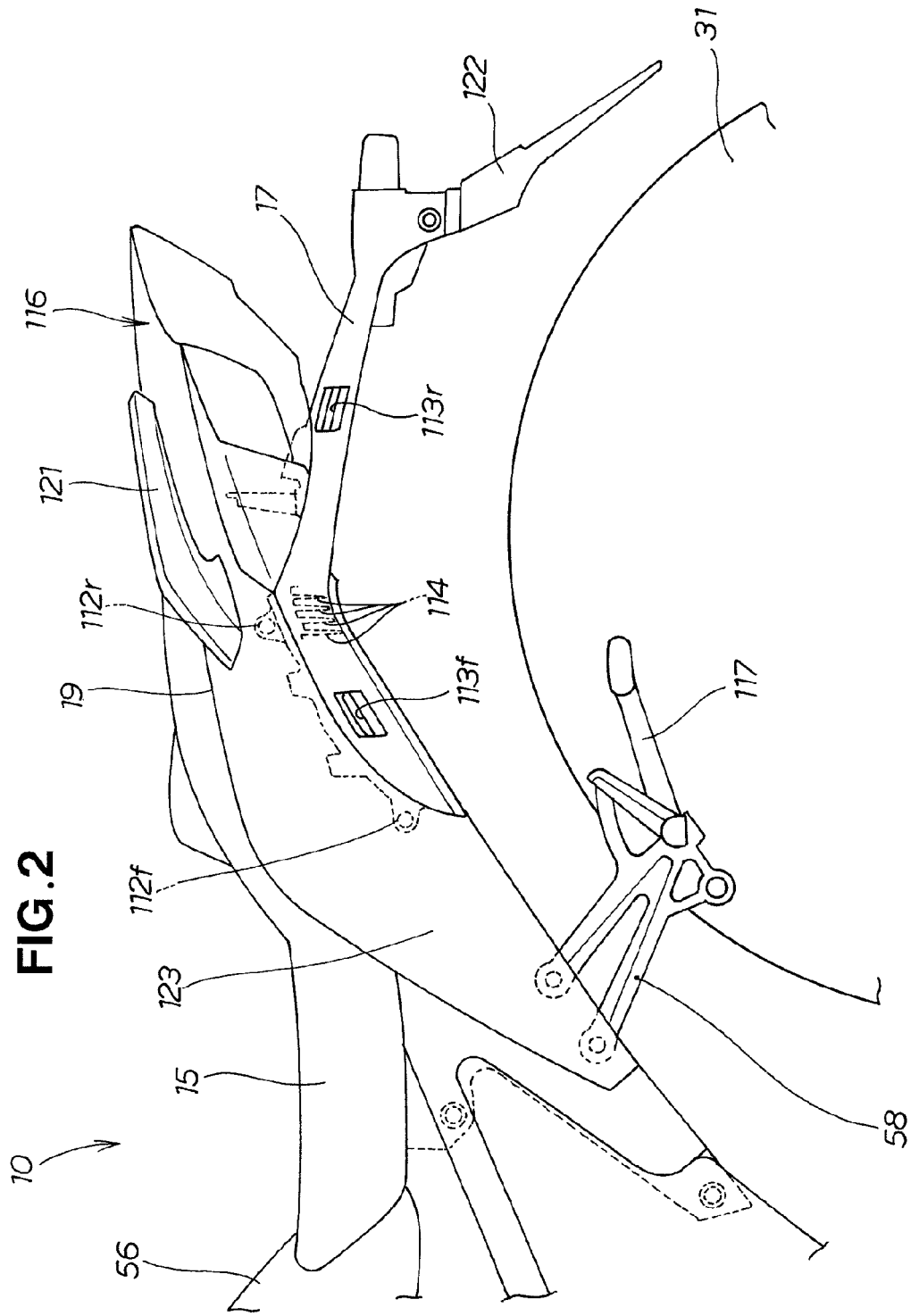
FIG. 2 is a rear side view of the two-wheeled motor vehicle to which the side trunk is mounted.

The rear fender 17 covering the top part of the rear wheel 31 is mounted on the rear frame 19 of the vehicle body frame 11 via front and rear fastening parts 112f, 112r, as shown in FIG. 2. Two side trunk mounting holes 113f, 113r for mounting the side trunk 111 are provided to the front and rear of the rear fender 17 (see FIG. 8), and a plurality of ribs (hanging parts) 114 which engages part of the side trunk 111 extends toward the inside of the rear fender 17 between the side trunk mounting holes 113f, 113r. These ribs 114 have both a mounting function for mounting the side trunk and a reinforcing function for reinforcing the hanging parts. The side trunk mounting holes 113f, 113r and the plurality of ribs 114 will be described hereinafter.

Figure 8:
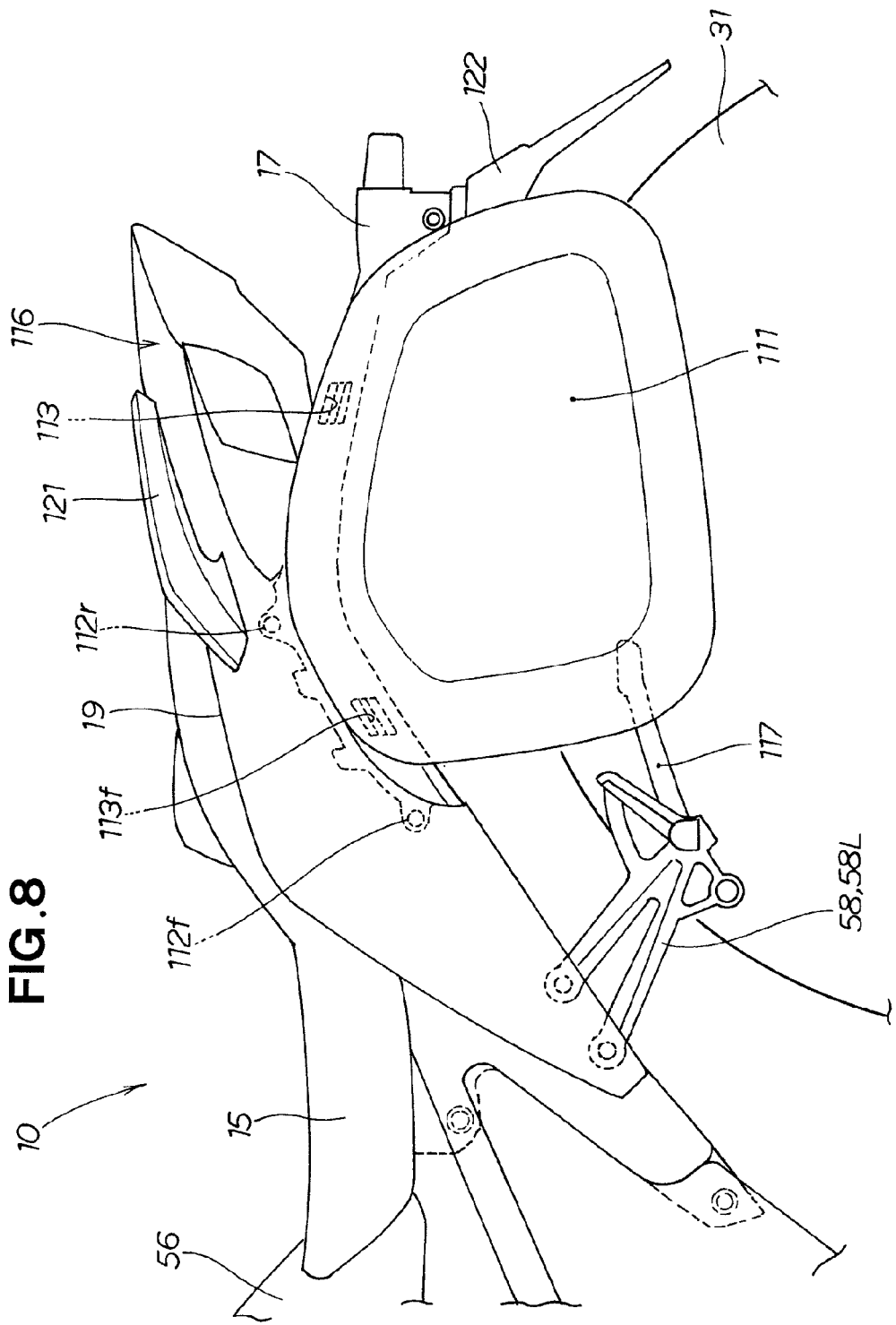
FIG. 8 is a view showing the side trunk as being mounted to the rear fender.

A tail light unit 116 including a stop light and rear turn signal lamps is provided to the rear part of the rider's seat 15 so as to jut outward to the left and right sides. A latch arm 117 extends rearward from the rider's step 58 and latches onto the side trunk 111, as shown in FIG. 8.

The reference numerals 121, 122, and 123 indicate a grab rail, a license bracket, and a rear cowl, respectively.

In the present embodiment, there are provided two front and rear fastening parts 112f, 112r for fastening the rear fender 17 to the vehicle body frame 11, but three or more fastening parts may also be provided. Two front and rear side trunk mounting holes 113f, 113r are also provided, but three or more may be provided as well.

The following is a description of a procedure for mounting the side trunk on the rear part of the vehicle.

Figure 3:
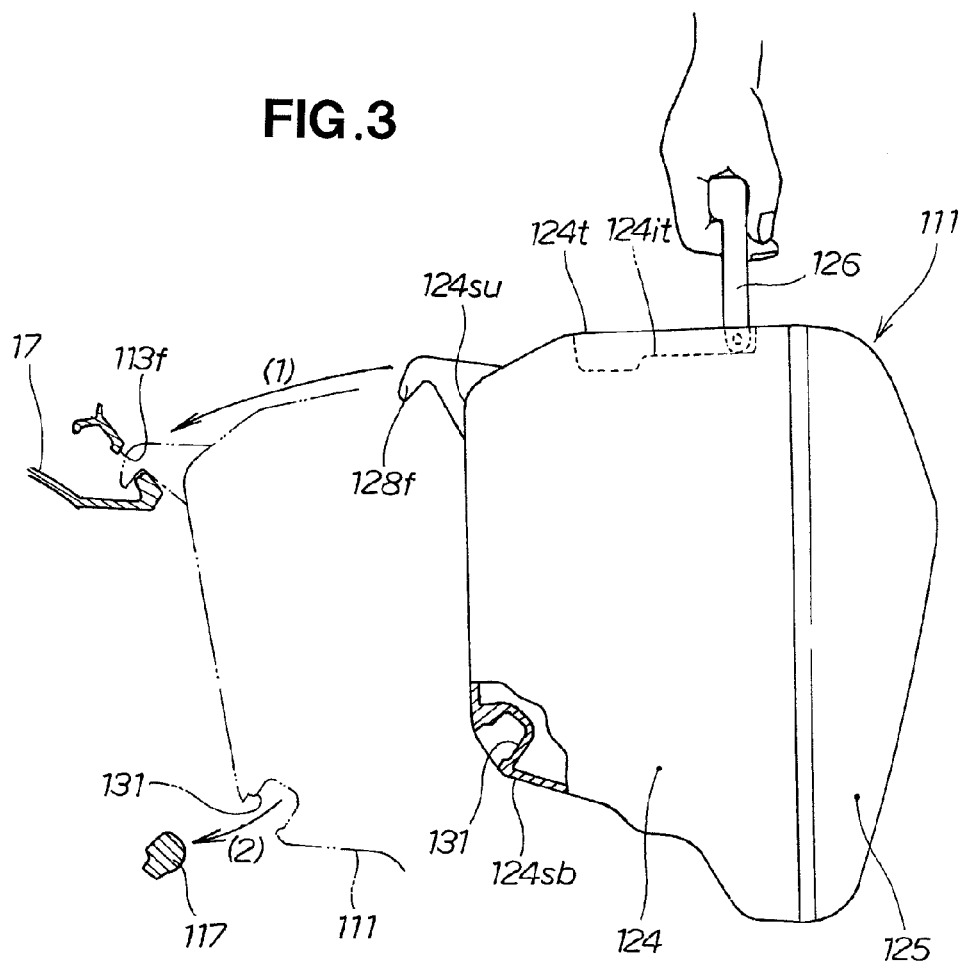
FIG. 3 is a view showing the side trunk mounted on the rear fender.

The side trunk 111 has a case body 124 for storing items, a cover body 125 for covering the exterior of the case body 124, a handle 126 swingably provided to a top surface 124t of the case body 124 and used when attaching, removing, and carrying the side trunk 111, front and rear pawls 128f, 128r (see FIG. 13) which are provided to a side surface top part 124su of the case body 124 and which engage with the front and rear side trunk mounting holes 113f, 113r, and an engaging concave part 131 which is similarly provided to a side surface bottom part 124sb and which engages with a distal end of the latch arm 117, as shown in FIG. 3. In other words, the side trunk 111 comprises pawls 128f, 128r which extend inward in the width direction of the vehicle body, curve downward, and hook into the side trunk mounting holes 113f, 113r.

To describe the mounting method, the handle 126 is held in the hand, the saddlebag 111 is brought to the rear part of the vehicle as shown by arrow (1), the pawls 128f, 128r are hooked into the saddlebag mounting holes 113f, 113r opened in the rear fender 17, and the engaging concave part 131 is engaged with the distal end of the latch arm 117 as shown by arrow (2).

Figure 4:
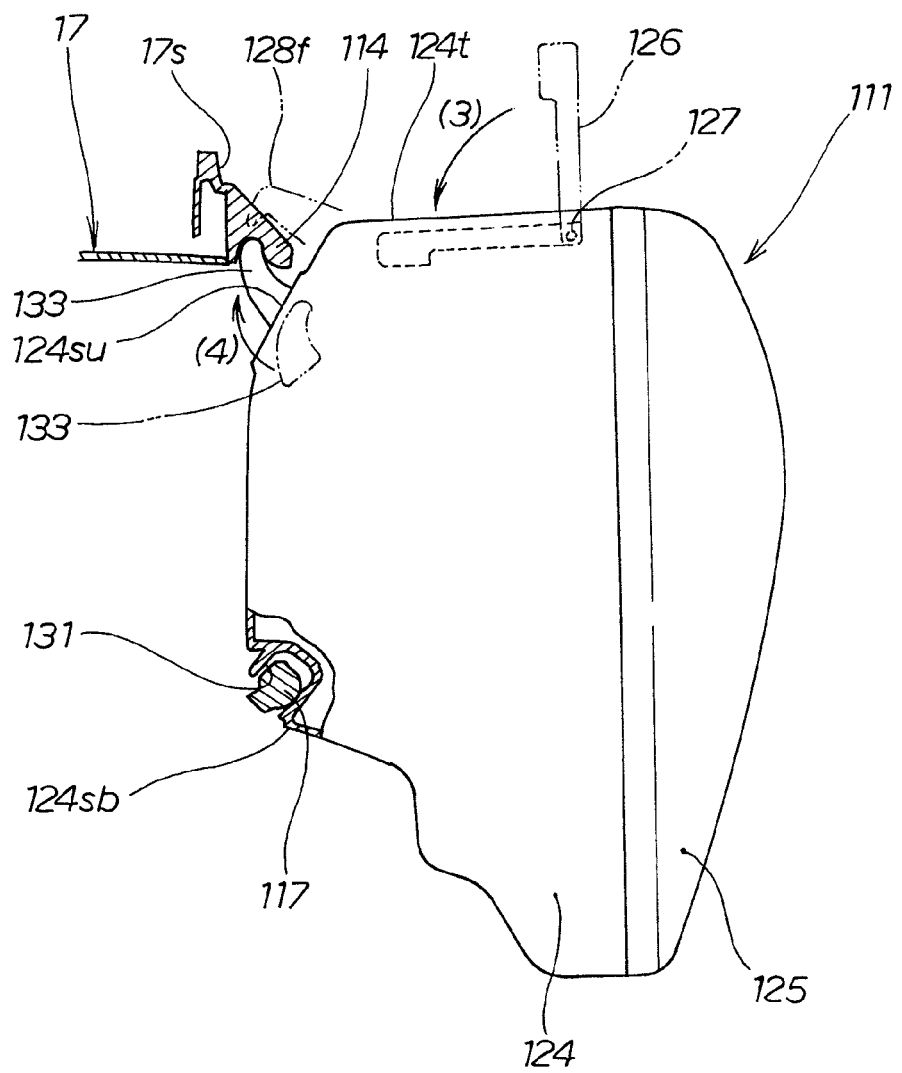
FIG. 4 is a view showing a state in which the lower engaging arms of the side trunk are engaged with the ribs of the rear fender.

The side surface top part 124su of the case body 124 forming the side trunk 111 is provided with a lower engaging arm 133, separate from the previously described pawls 128f, 128r, for engaging with the ribs 114 extending downward from a side part 17S of the rear fender 17, as shown in FIG. 4. This lower engaging arm 133 moves with the swinging of the handle 126.

In other words, the side trunk 111 comprises a lower engaging arm 133 which is provided below the front and rear pawls 128f, 128r, which extends upward toward the inside of the vehicle body, and which, together with the front and rear pawls 128f, 128r, holds the rear fender 17.

The continuation of the mounting method shall now be described. When the handle 126 is swung about a shaft 127 as shown by arrow (3), the lower engaging arm 133 housed within the side surface top part 124su of the case body 124 protrudes from the side surface top part 124su of the case body as shown by arrow (4) and engages with each of the plurality of ribs 114 provided to the rear fender 17. In other words, the rear fender 17 is held between the pawls 128f, 128r and the lower engaging arm part 133, and the side trunk 111 is mounted onto the rear fender 17. The series of operations for mounting the side trunk 111 onto the rear fender 17 is thus complete. The operations for removing the side trunk 111 from the rear fender 17 are preferably performed in the reverse order of the operations described above, and are not described herein.

The following is a description, made with reference to the drawings presented hereinbelow, of the side trunk structure for implementing the mounting method described above.

FIG. 5 shows a lower engaging arm link assembly provided to the side trunk 111. The cover for covering an inside top surface 124it of the case body 124 has been removed.

A first stay 135 is provided to the inside top surface 124it of the case body 124. The handle 126 is swingably provided to the first stay 135. Drive fulcra 136, 136 extend from the handle 126 and transmit drive force from the handle 126 to the lower engaging arm 133. First arms 137, 137 extend from these drive fulcra 136, 136. A second stay 139 is provided to the inside top surface 124it, and this stay supports the lower engaging arm part 133 and other components. An upper fulcrum 141 and a lower fulcrum 142 are provided to the top part of the second stay 139. A drive link 143 is swingably provided to the upper fulcrum 141, and being connected to distal ends 137a of the first arms 137, the drive link 143 drives the lower engaging arm 133 along with the swinging of the first arms 137. An auxiliary link 144 is swingably provided to the lower fulcrum 142. An upper drive arm 147 extends from the drive link 143 to an upper swing point 145 for swingably supporting the lower engaging arm 133. An auxiliary arm 148 extends from the auxiliary link 144 to a lower swing point 146 for swingably supporting the lower engaging arm 133. The first stay 135 and the second stay 139 are independently mounted onto the case body 124 separately from each other.

The handle 126 is stored below the top surface 124t of the case body 124 without jutting out from the top surface 124t. The lower engaging arm 133 is provided so as to protrude from the side surface top part 124su of the case body 124 (FIG. 4). When the lower engaging arm part 133 is engaged with the rear fender, a lock mechanism 161 locks the handle 126, rendering it inoperable.

The lock mechanism 161 comprises a key cylinder 162, a first key link 164 extending from the key cylinder 162 to a relay member 163, a second key link 165 extending from the relay member 163, a lock member 166 which is mounted on the second key link 165 and which locks the handle 126 in conjunction with the movement of the second key link 165, and a pin 167 which is a fulcrum of the relay member 163.

Figure 6A:
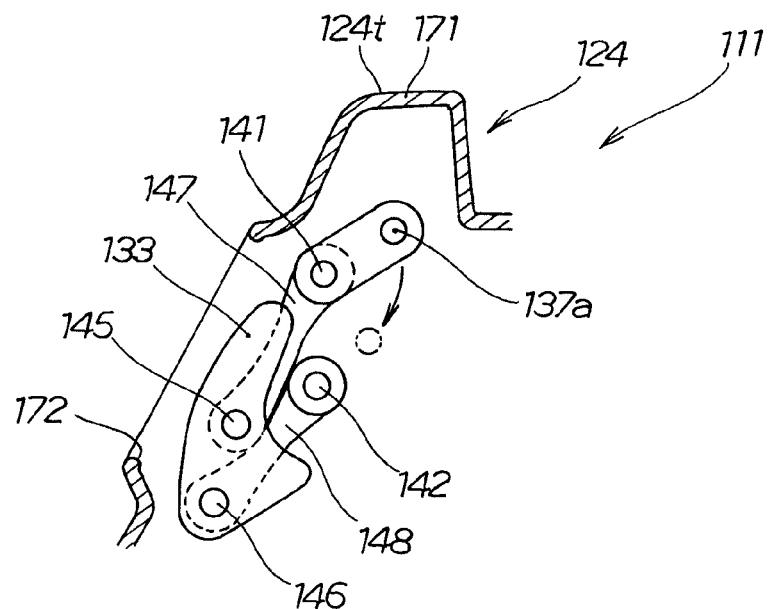
FIG. 6A is a view showing the lower engaging arms as being housed inside the cover.
Figure 6B:
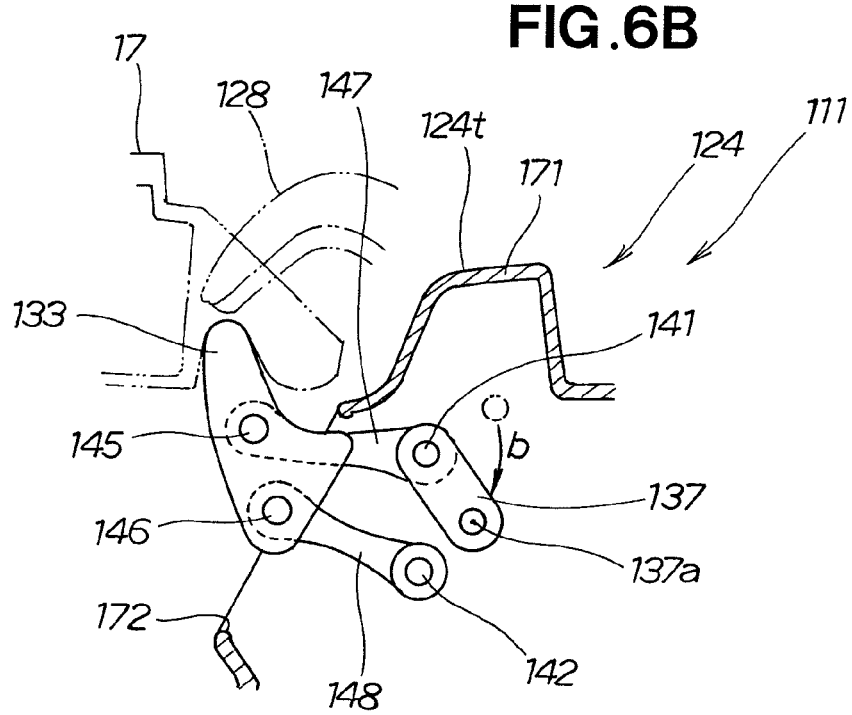
FIG. 6B is a view showing the rear fender as being held between the lower engaging arms and the pawls.

FIGS. 6A and 6B show the action of the lower engaging arm link assembly provided to the side trunk 111. In a cover 171 for covering the inside top surface 124it (FIG. 5) of the case body 124, an opening 172 is formed so as to allow the lower engaging arm 133 to protrude therethrough.

In FIG. 6A, the lower engaging arm 133 is positioned to the inside of the opening 172. The handle 126 (FIG. 5) stands perpendicular to the top surface 124*t* of the case body 124, and the side trunk 111 can easily be carried by grasping the handle 126.

In FIG. 6B, the lower engaging arm 133 protrudes from the opening 172. When the handle 126 is swung and stored substantially parallel to the top surface 124*t* of the case body 124, the distal ends 137*a* of the first arms 137 move clockwise as shown by arrow b, driving the upper drive arm 147 and causing the lower engaging arm 133 to protrude. The auxiliary arm 148 supporting the lower engaging arm 133 also moves with the protrusion of the lower engaging arm 133.

The protruding of the lower engaging arm 133 from the opening 172 causes the rear fender 17 to be clamped between the pawl 128 and the lower engaging arm 133, and the side trunk 111 is mounted onto the rear fender 17.

Figure 7:
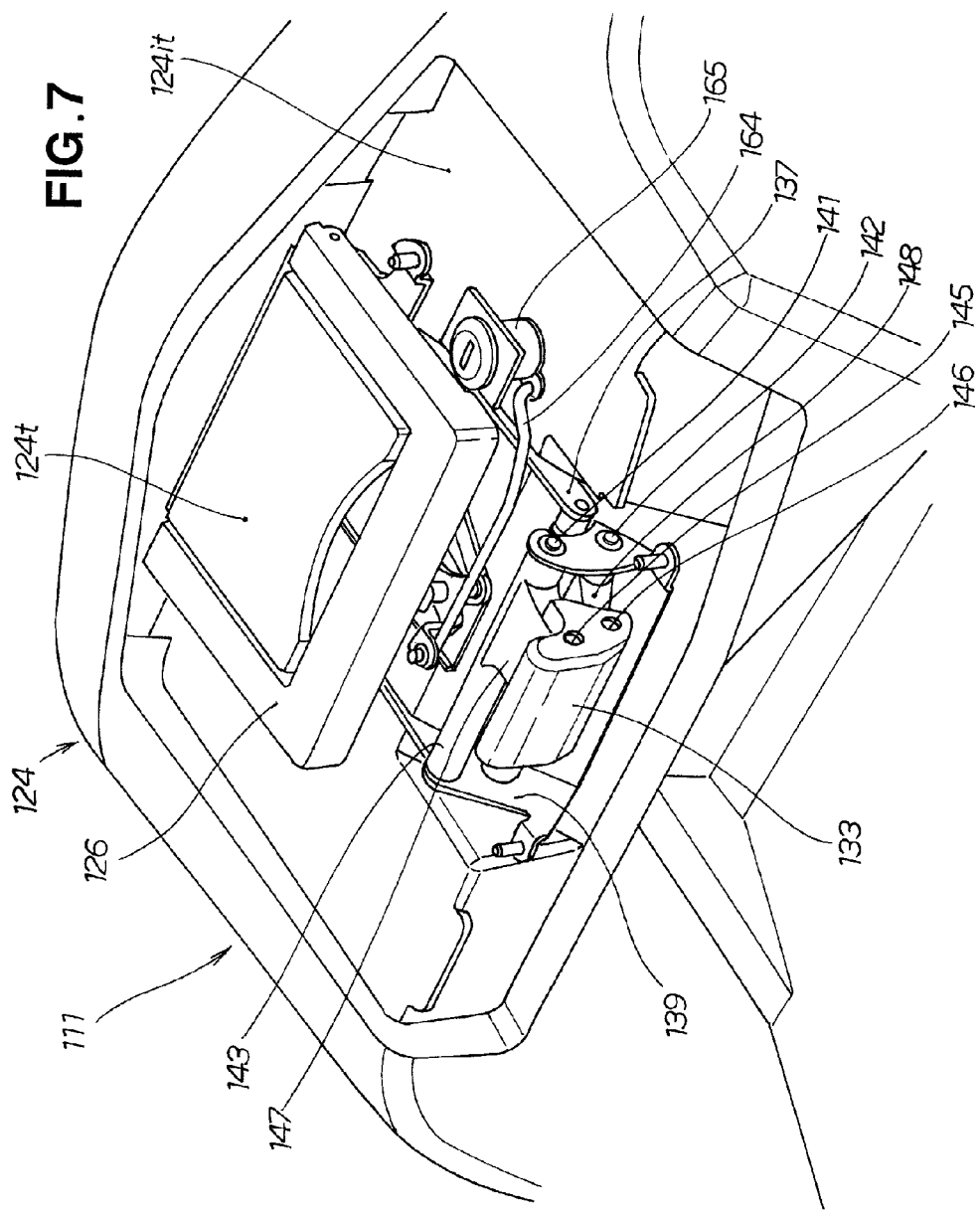
FIG. 7 is a view showing the handle as being housed in a top surface concave part formed in the side trunk.

The handle 126 is stored without jutting out from the top surface 124*t* of the case body 124 as shown in FIG. 7. When the handle 126 is in a state where the lower engaging arm 133 is extended, the lower engaging arm 133 shall protrude from the opening 172 (FIG. 6) formed in the cover 171 when the cover 171 (FIG. 6) has been provided. As long as this handle is provided, so that the side trunk will be readily portable, a side trunk having a desirable ease of being attached and removed is obtained.

FIG. 8 shows a state in which the side trunk 111 has been mounted onto the side surface of the rear fender 17. The rear fender 17 is mounted onto the rear frame 19 via the front and rear fastening parts 112*f*, 112*r*, and the saddlebag 111 is mounted onto the rear fender 17.

Since at least one of the front and rear side trunk mounting holes 113*f*, 113*r* is provided between the two front and rear fastening parts 112*f*, 112*r*, the mounting strength of the side trunk 111 can be increased.

The front side trunk mounting holes 113*f*, 113*f* are provided below the rider's seat 15 as shown in FIG. 9. The tail light unit 116 is provided to the rear part of the rider's seat 15. The rear side trunk mounting holes 113*r*, 113*r* are covered from above by the tail light unit 116.

Thus, since the four saddlebag mounting holes 113*f*, 113*f*, 113*r*, 113*r* provided to the front and rear are covered by the rider's seat 15 and the tail light unit 116, the side trunk mounting holes 113*f*, 113*r*, 113*f*, 113*r* can be obscured from view.

The rear fender 17 is formed from a resin containing glass fibers or carbon fibers. Therefore, the load-bearing capacity of the rear fender 17 can be increased. In the drawings, the reference numerals 174, 175, 176, and 177 indicate an item container, a relay/fuse box, a rear reservoir tank, and a motor for driving the exhaust device, respectively.

Figure 10:
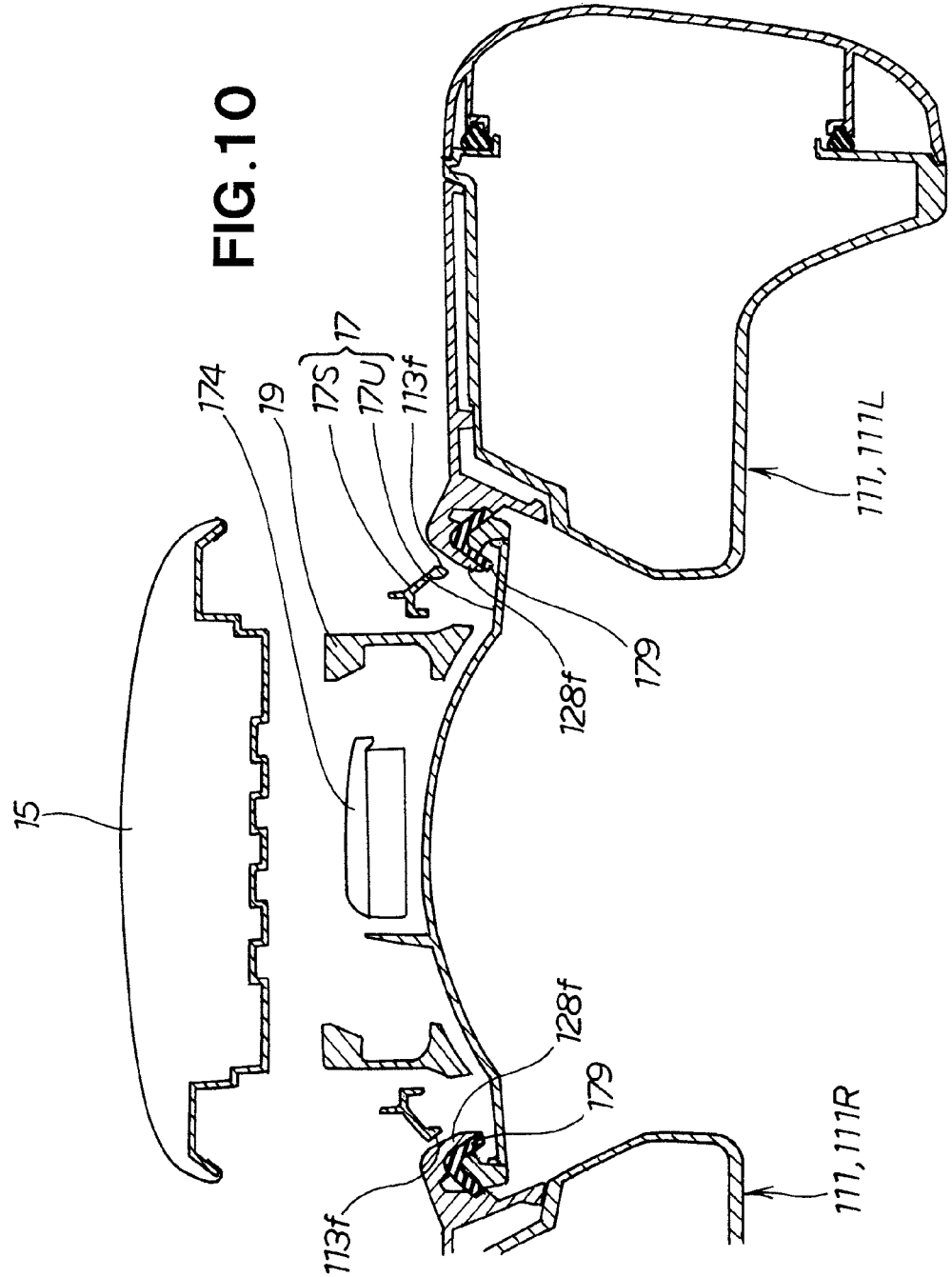
FIG. 10 is a sectional view taken along line 10-10 of FIG. 9.

FIG. 10 shows a state in which the front pawls 128*f*, 128*f* of the side trunk 111 are engaged with the front side trunk mounting holes 113*f*, 113*f* formed in the rear fender 17.

The rear fender 17 is disposed below the rear frame 19 which also serves as a seat rail. The rear fender 17 is composed of an inner rear fender 17U describing the shape of an arch as a rear wheel housing, and an outer rear fender 17S disposed outward of the inner rear fender 17U. The side trunk mounting holes 113*f*, 113*f* are provided in the outer rear fender 17S.

The front pawls 128*f*, 128*f* provided to the side trunk 111 are provided with elastic members 179, 179. Therefore, pressing the elastic members 179, 179 into the rear fender 17 and causing the front pawls 128*f*, 128*f* to fit tightly in the side trunk mounting holes 113*f*, 113*f* of the rear fender 17 makes it unlikely that gaps will form between the pawls and the mounting holes. Therefore, for example, the problem of rattling in the side trunk 111 can be resolved, and the side trunk 111 can be firmly held against the rear fender 17. However, the elastic members may be omitted.

Hereinbelow, in FIGS. 11 through 13, since the mounting structures of the left and right saddlebags 111L, 111R are disposed in bilateral symmetry about the longitudinal center of the vehicle, the left side trunk 111L is denoted as the saddlebag 111, and the left mounting structure is described while a description of the right mounting structure is omitted.

Figure 11:
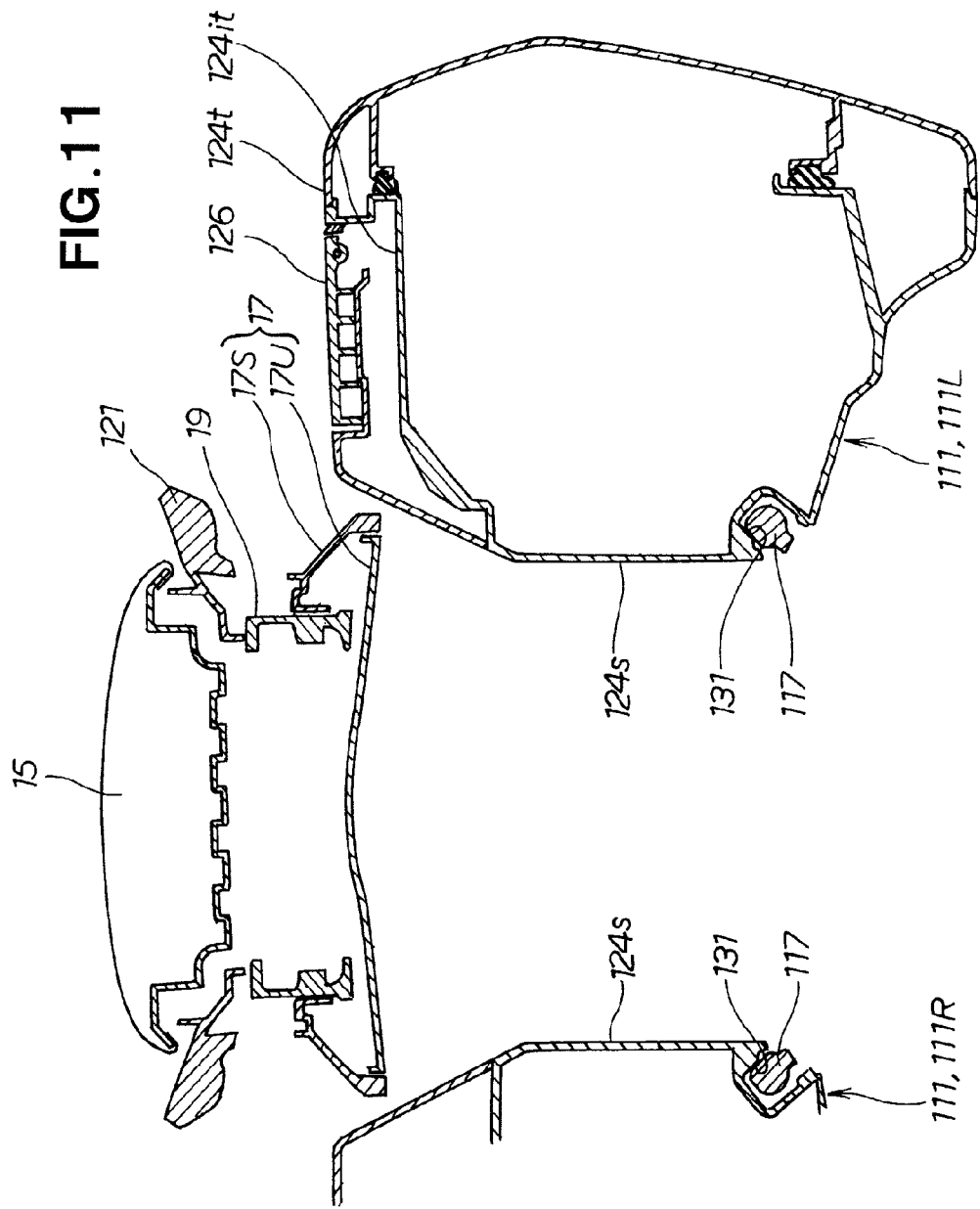
FIG. 11 is a sectional view taken along line 11-11 of FIG. 9.

As shown in FIG. 11, a side surface 124*s* of the side trunk 111 on the side facing the vehicle body frame 11 (FIG. 11) is provided with an engaging concave part 131 for engaging with the latch arm 117 which is attached to the vehicle body frame and which extends from the rider's steps 58L, 58R (FIG. 9).

Since the side trunk 111 is provided with the engaging concave part 131 for engaging with the latch arm 117 extending from the rider's step 58 (FIG. 2), a more attractive external appearance is obtained when the side trunk 111 has been mounted.

FIG. 12 shows a state in which the lower engaging arm 133 of the side trunk 111 is engaged with the ribs 114, 114 extending downward from the side part of the rear fender 17.

Referring also to FIG. 2, since the plurality of ribs 114 extends downward in the side part 17*s* of the rear fender 17, the side trunk 111 can be supported even when the lower engaging arm 133 is short. Since the plurality of ribs 114 extends downward toward the inside of the rear fender 17, the external appearance of the vehicle is not diminished even when the side trunk 111 is removed from the rear fender 17.

The rear pawl 128*r* of the side trunk 111 engages with the rear mounting hole 113*r* of the rear fender 17, as shown in FIG. 13. Since the rear pawl 128*r* is provided with an elastic member 179, pressing the elastic member 179 into the rear fender 17 and causing the rear pawl 128*r* to fit tightly into the rear side trunk mounting hole 113*r* of the rear fender 17 enables the saddlebag 111 to be mounted on the rear fender 17 without any rattling even when there is a gap between the rear pawl 128*r* and the side trunk mounting hole 113*r*.

Figure 14A:
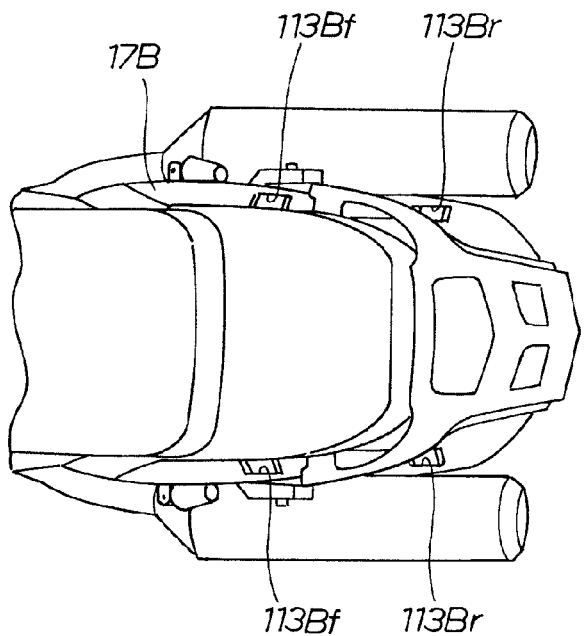
FIG. 14A is a top surface view of the rear part of a conventional two-wheeled motor vehicle.
Figure 14B:
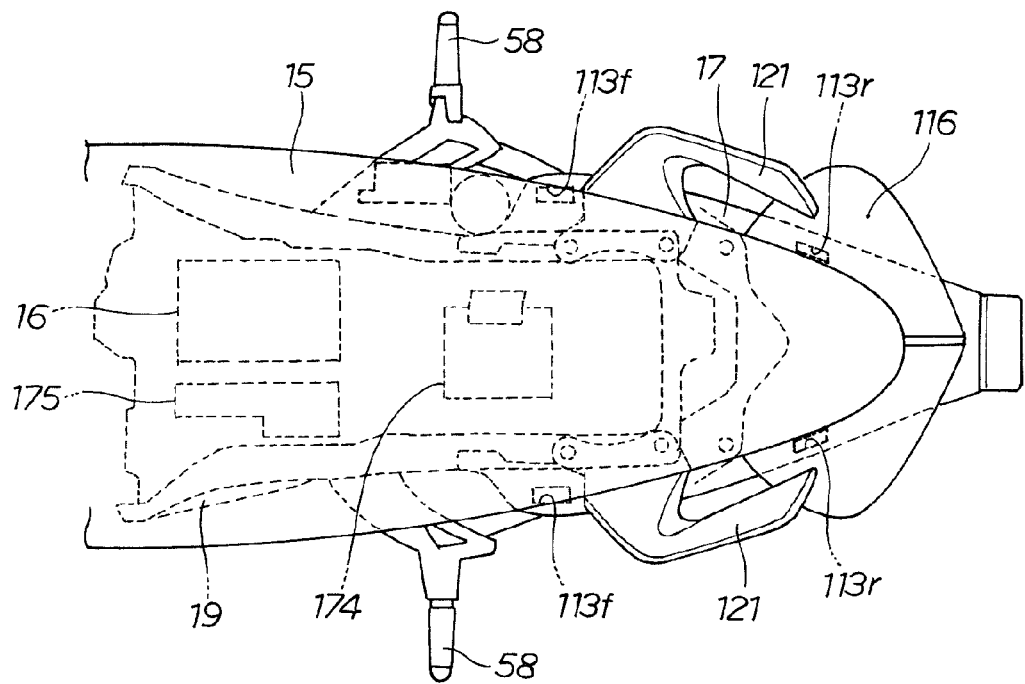
FIG. 14B is a top view of the rear part of the two-wheeled motor vehicle according to the present embodiment.

FIGS. 14A and 14B comparatively show a conventional side trunk mounting structure and the side trunk mounting structure according to the present embodiment.

In the conventional side trunk mounting structure as shown in FIG. 14A, there are no members covering the four side trunk mounting holes 113Bf, 113Br, 113Bf, 113Br from above, and all of the side trunk mounting holes 113Bf, 113Br, 113Bf, 113Br are exposed from above in the vehicle. The side trunk mounting holes 113Bf, 113Br, 113Bf, 113Br are provided in the top surface of the rear frame. Although these side trunk mounting holes 113Bf, 113Br, 113Bf, 113Br are covered by the rear fender 17B, when the side trunks are removed, the mounting holes are exposed, diminishing the external appearance of the vehicle.

To prevent such an occurrence, the side trunk mounting holes 113*f*, 113*r*, 113*f*, 113*r* are formed in the rear fender 17 in the side trunk mounting structure according to the present embodiment shown in FIG. 14B. The side trunks 111 are directly mounted in the side trunk mounting holes 113*f*, 113*r*, 113*f*, 113*r* formed in the rear fender 17 as shown in FIG. 8. Since the side trunk mounting holes 113*f*, 113*r*, 113*f*, 113*r* are provided below the rider's seat 15 and the tail light unit 116, the side trunk mounting holes 113*f*, 113*r*, 113*f*, 113*r* can be obscured from view. Thus, removing the side trunks does not affect the external appearance of the vehicle, which is thus improved.

The rear fender may be composed of a steel plate, an aluminum alloy, titanium, or another metal material instead of a resin containing glass fibers or carbon fibers.

INDUSTRIAL APPLICABILITY

The present invention is suitable for use in a two-wheeled motor vehicle having a detachable side trunk.

REFERENCE SIGNS LIST

10 Two-wheeled motor vehicle
15 Rider's seat
17 Rear fender
19 Rear frame
31 Rear wheel
111, 111L, 111R Saddlebags
112f, 112r Fastening parts
113f, 113r Saddlebag mounting holes
114 Hanging parts (ribs)
117 Latch arm
128f, 128r Pawls
131 Engaging concave part
133 Lower engaging arm part
179 Elastic member

The invention claimed is:

1. A side trunk mounting structure, comprising:
a rear frame disposed on a rear part of a vehicle body;
a rear fender, provided below the rear frame, for covering a rear wheel;
a rider's seat, provided above the rear fender, for positioning a rider; and
a side trunk mounted to a side surface of the rear fender, said side trunk having a top portion, an inner surface and an outer surface,
wherein the rear fender has a plurality of side trunk mounting holes for mounting the side trunk,
the side trunk has a plurality of pawls, extending inwardly of the vehicle body and bending downward, for hooking into respective side trunk mounting holes, and a lower engaging arm provided below the respective pawls and extendable upwardly and inwardly of the vehicle body,
a handle operatively connected to the lower engaging arm for extending the lower engaging arm from a position concealed within the side trunk wherein the lower engaging arm does not extend beyond the inner surface to a projecting position to extend outwardly and upwardly relative to the inner surface of the side trunk for engagement with ribs formed on the rear fender for holding the side trunk to the rear fender in cooperation with the pawls, said plurality of pawls extending from adjacent the top portion of the side trunk with the lower engaging arm being provided between the pawls and substantially on a same elevation as the pawls when the lower engaging arm is extended outwardly from within the side trunk and upwardly to project from the inner surface of the side trunk to engage with the ribs formed on the rear fender, and
the side trunk is mounted to the rear fender by the rear fender being held between the pawls and the lower engaging arm,
said inner surface having an engaging concave part for engaging with a latching arm that is mounted on the vehicle body frame and extends from a co-rider's step holder.

2. The side trunk mounting structure of claim 1, wherein each of the side trunk mounting holes is provided below the rider's seat.

3. The side trunk mounting structure of claim 1, wherein the rear fender is formed from a resin containing one of glass fibers and carbon fibers.

4. The side trunk mounting structure of claim 1, wherein the ribs formed on the rear fender include a plurality of downwardly extending hanging parts held by the lower engaging arms.

5. The side trunk mounting structure of claim 1, wherein the rear fender is fastened to the vehicle body frame by at least front and rear fastening parts, and at least one of the side trunk mounting holes is provided between the front and rear fastening parts.

6. The side trunk mounting structure of claim 1, wherein each of the pawls, which hook into the respective side trunk mounting holes, is provided with an elastic member.

7. The side trunk mounting structure of claim 1, and further including a first arm operatively connected to said handle and to a upper-drive arm connected to an upper portion of the lower engaging arm and an auxiliary arm operatively connected to a lower portion of the lower engaging arm wherein when the handle is actuated, the upper-drive arm and the auxiliary arm impart movement to extend the lower engaging arm into engagement with the ribs formed in the rear fender.

8. A side trunk mounting structure, comprising:
a rear frame disposed on a rear part of a vehicle body;
a side trunk mounted to a side surface of a rear fender, said side trunk having a top portion, an inner surface and an outer surface,
a plurality of side trunk mounting holes formed on the rear fender for mounting the side trunk,
a plurality of pawls formed on the side trunk, said plurality of pawls extending inwardly of the vehicle body and bending downwardly for hooking into respective side trunk mounting holes, and
a lower engaging arm provided below the respective pawls,
a handle operatively connected to the lower engaging arm for extending the lower engaging arm from a position concealed within the side trunk wherein the lower engaging arm does not extend beyond the inner surface to a projecting position to extend outwardly and upwardly relative to the inner surface of the side trunk for engagement with a respective rib formed on the rear fender for holding the side trunk to the rear fender in cooperation with the plurality of pawls, said plurality of pawls extending from adjacent the top portion of the side trunk with the lower engaging arm being provided between the pawls and substantially on a same elevation as the pawls when the lower engaging arm is extended outwardly from within the side trunk and upwardly to project from the inner surface of the side trunk to engage with the ribs formed on the rear fender, and
the side trunk is mounted to the rear fender and is held between the plurality of pawls and the plurality of lower engaging arm,
said inner side surface having an engaging concave part for engaging with a latching arm that is mounted on the vehicle body frame and extends from a co-rider's step holder.

9. The side trunk mounting structure of claim 8, wherein each of the side trunk mounting holes is provided below a rider's seat.

10. The side trunk mounting structure of claim 8, wherein the rear fender is formed from a resin containing one of glass fibers and carbon fibers.

11. The side trunk mounting structure of claim 8, wherein the ribs on the rear fender are formed by a plurality of downwardly extending hanging parts held by the lower engaging arms.

12. The side trunk mounting structure of claim 8, wherein the rear fender is fastened to the vehicle body frame by at least front and rear fastening parts, and at least one of the side trunk mounting holes is provided between the front and rear fastening parts.

13. The side trunk mounting structure of claim 8, wherein each of the pawls, which hook into the respective side trunk mounting holes, is provided with an elastic member.

14. The side trunk mounting structure of claim 8, and further including a first arm operatively connected to said handle and to a upper-drive arm connected to an upper portion of the lower engaging arm and an auxiliary arm operatively connected to a lower portion of the lower engaging arm wherein when the handle is actuated, the upper-drive arm and the auxiliary arm impart movement to extend the lower engaging arm into engagement with the ribs formed in the rear fender.

* * * * *